Nov. 7, 1967 H. BRAND 3,350,756
BRICK MANUFACTURING APPARATUS
Filed Sept. 21, 1964 9 Sheets-Sheet 2

INVENTOR.
HEINZ BRAND
BY Norman J. Blodgett

INVENTOR.
HEINZ BRAND

INVENTOR.
HEINZ BRAND

INVENTOR.
HEINZ BRAND

INVENTOR.
HEINZ BRAND

Nov. 7, 1967     H. BRAND     3,350,756

BRICK MANUFACTURING APPARATUS

Filed Sept. 21, 1964     9 Sheets-Sheet 8

INVENTOR.
HEINZ BRAND
BY

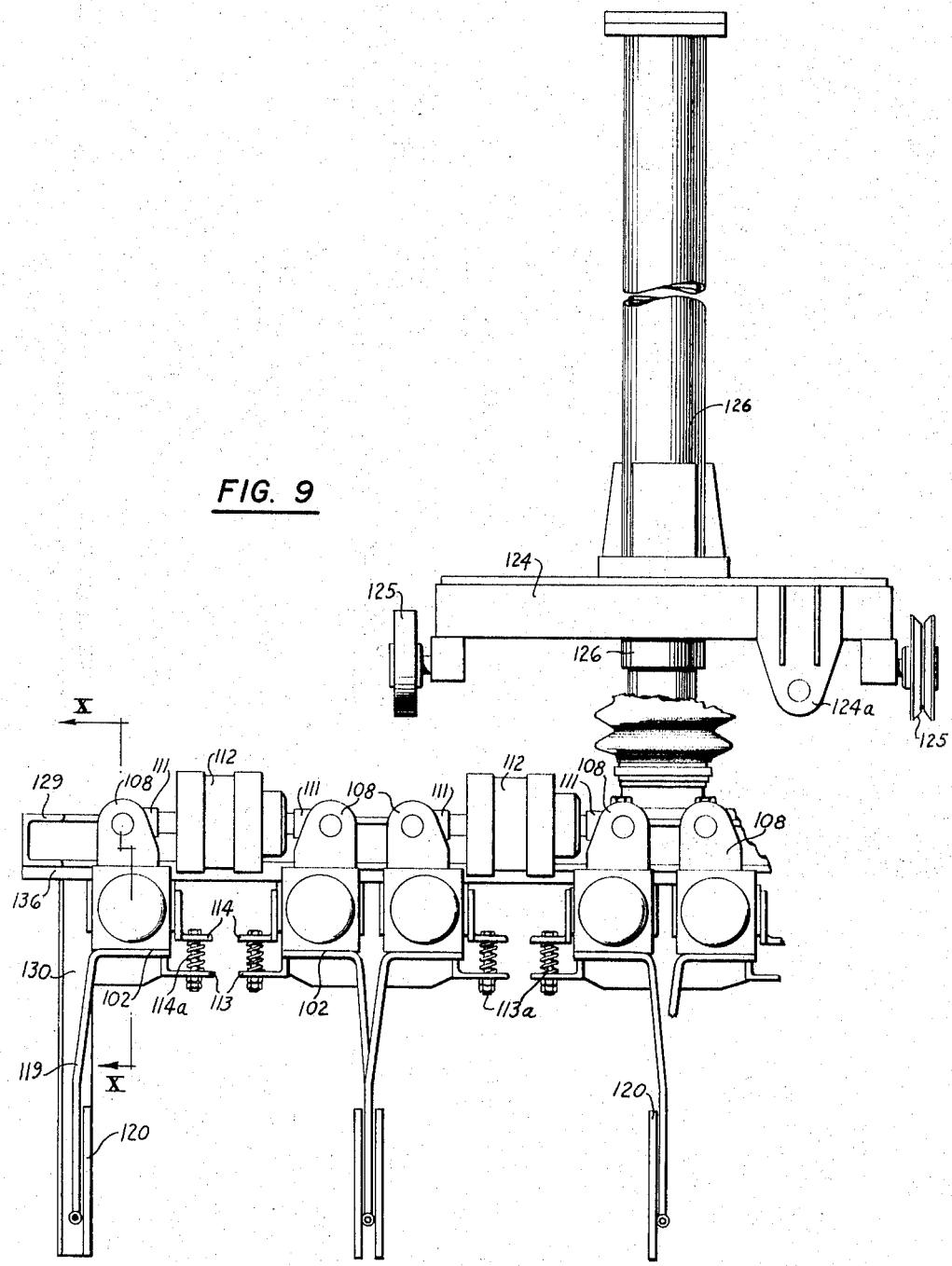

ered Nov. 7, 1967

United States Patent Office 3,350,756
BRICK MANUFACTURING APPARATUS
Heinz Brand, Dorsten, Westphalia, Germany, assignor to Dorstener Eisengiesserei Maschinfabric, AG, Dorsten, Westphalia, Germany, a corporation of Germany
Filed Sept. 21, 1964, Ser. No. 397,836
8 Claims. (Cl. 25—2)

This invention relates to brick manufacturing apparatus and, more particularly, to equipment arranged to produce bricks or the like by a pressing operation and, automatically, to stack them on cars for transportation.

The present invention concerns itself with a device to form bricks in a press and is equipped with a gripper arm which moves parallel to the press table surface to place finished bricks on a transport car. Devices of this kind have been known in the past in several designs. They usually involve one of several types of presses and allow for the transportation of the formed bricks to stacking devices out of the press mold. However, as more efficient presses are being made with higher production rates, difficulties arise. The speed of the transportation apparatus cannot be raised as fast as the press output because of the fact that the pressed bricks are delicate and because of the size of the masses which have to be accelerated and decelerated with higher press output. These and other difficulties experienced with the prior art devices have been obviated in a novel manner by the present invention.

It is, therefore, an outstanding object of the present invention to provide a brick manufacturing apparatus capable of extremely high production rate.

Another object of this invention is the provision of a brick manufacturing apparatus which is relatively simple in construction, which is inexpensive to manufacture, and which is capable of a long life of useful service with a minimum of maintenance.

A further object of the present invention is the provision of a brick manufacturing apparatus including means for stacking the bricks very rapidly so as to maintain pace with the production of a high capacity brick press.

It is another object of the instant invention to provide a brick-manufacturing apparatus including a press capable of highly efficient operation.

With these and other objects in view, as will be apparent to those skilled in the art, the invention resides in the combination of parts set forth in the specification and covered by the claims appended hereto.

Figure 1:
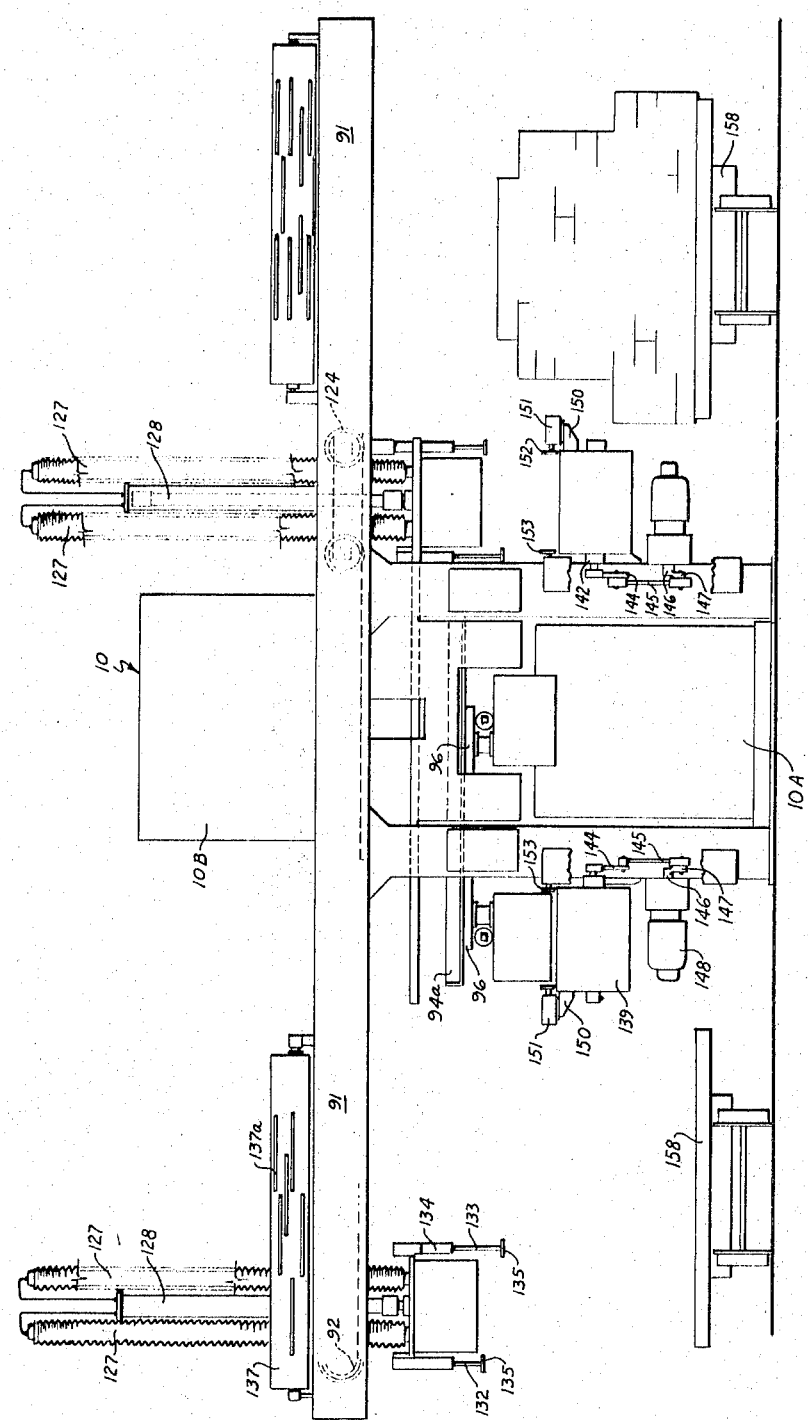
Figure 2:
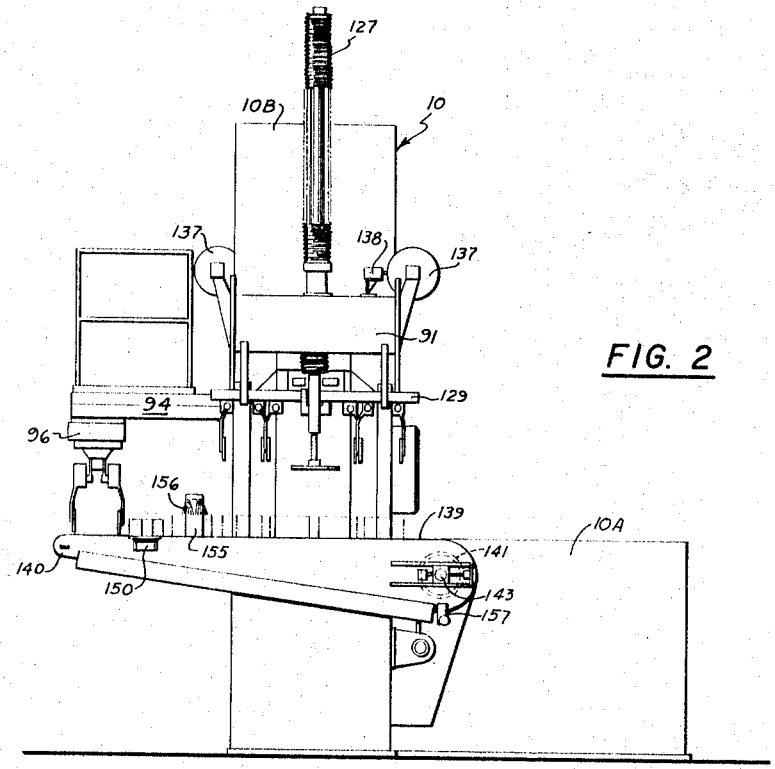
Figure 3:
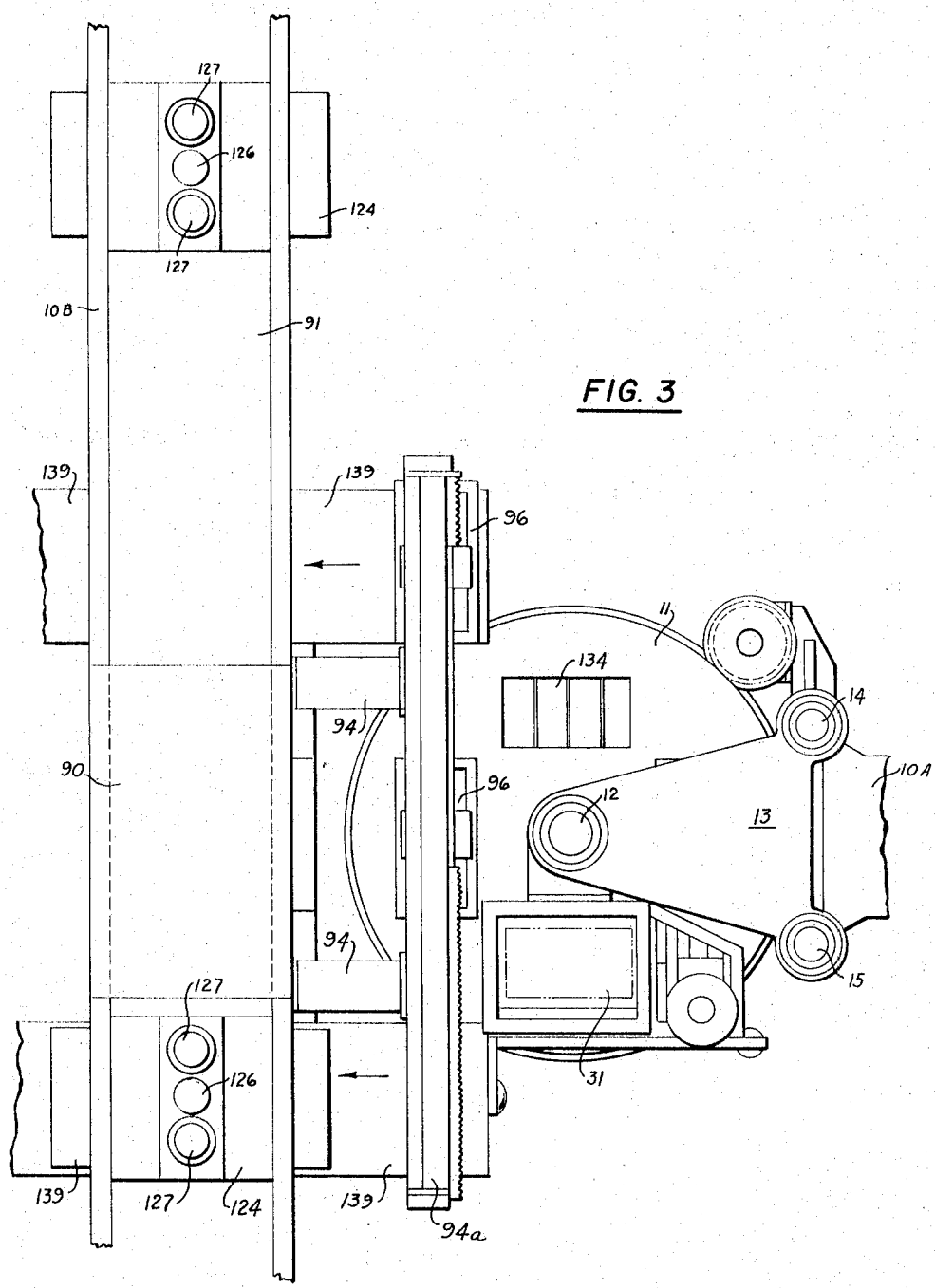
Figure 4:
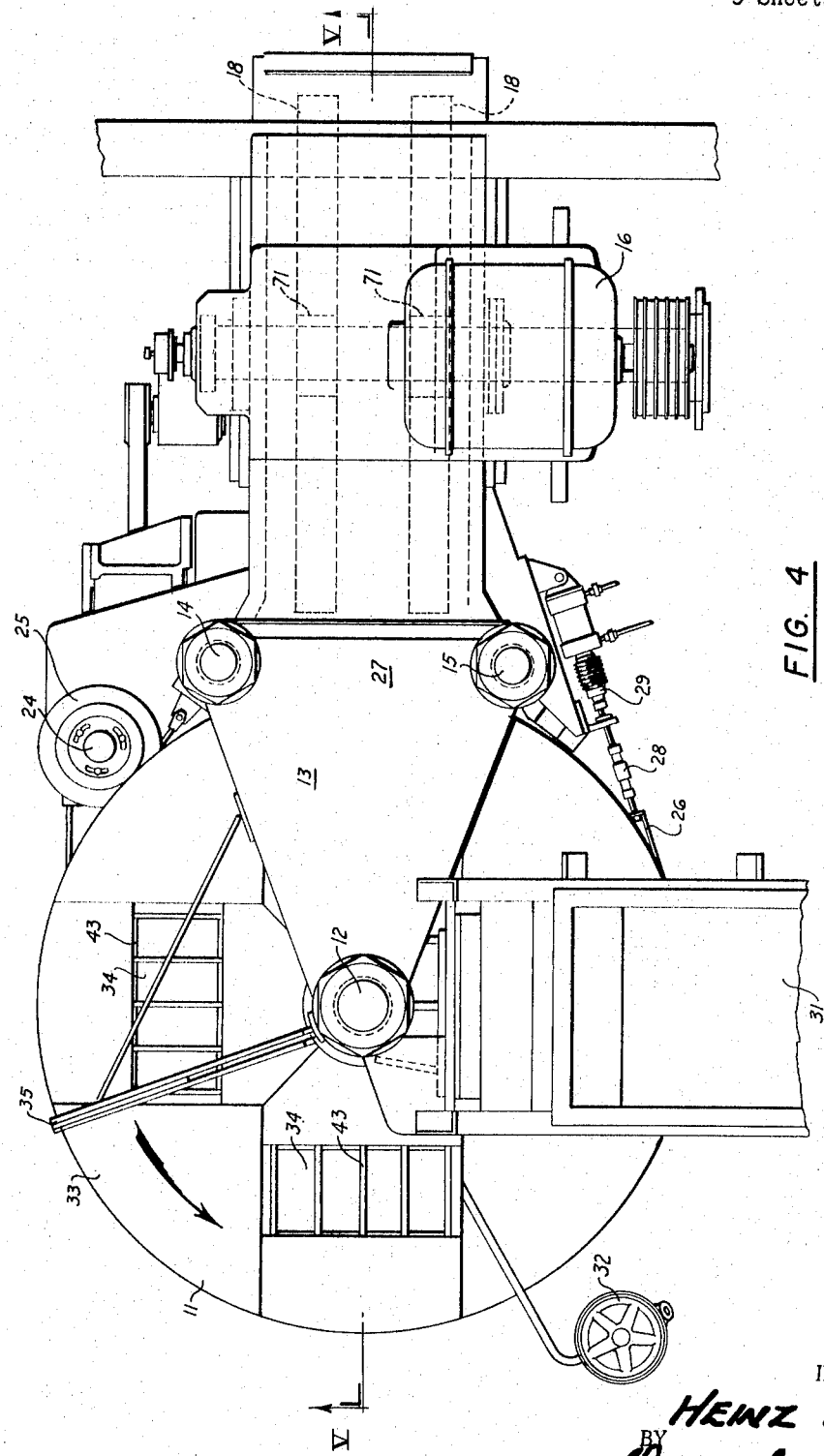
Figure 5:
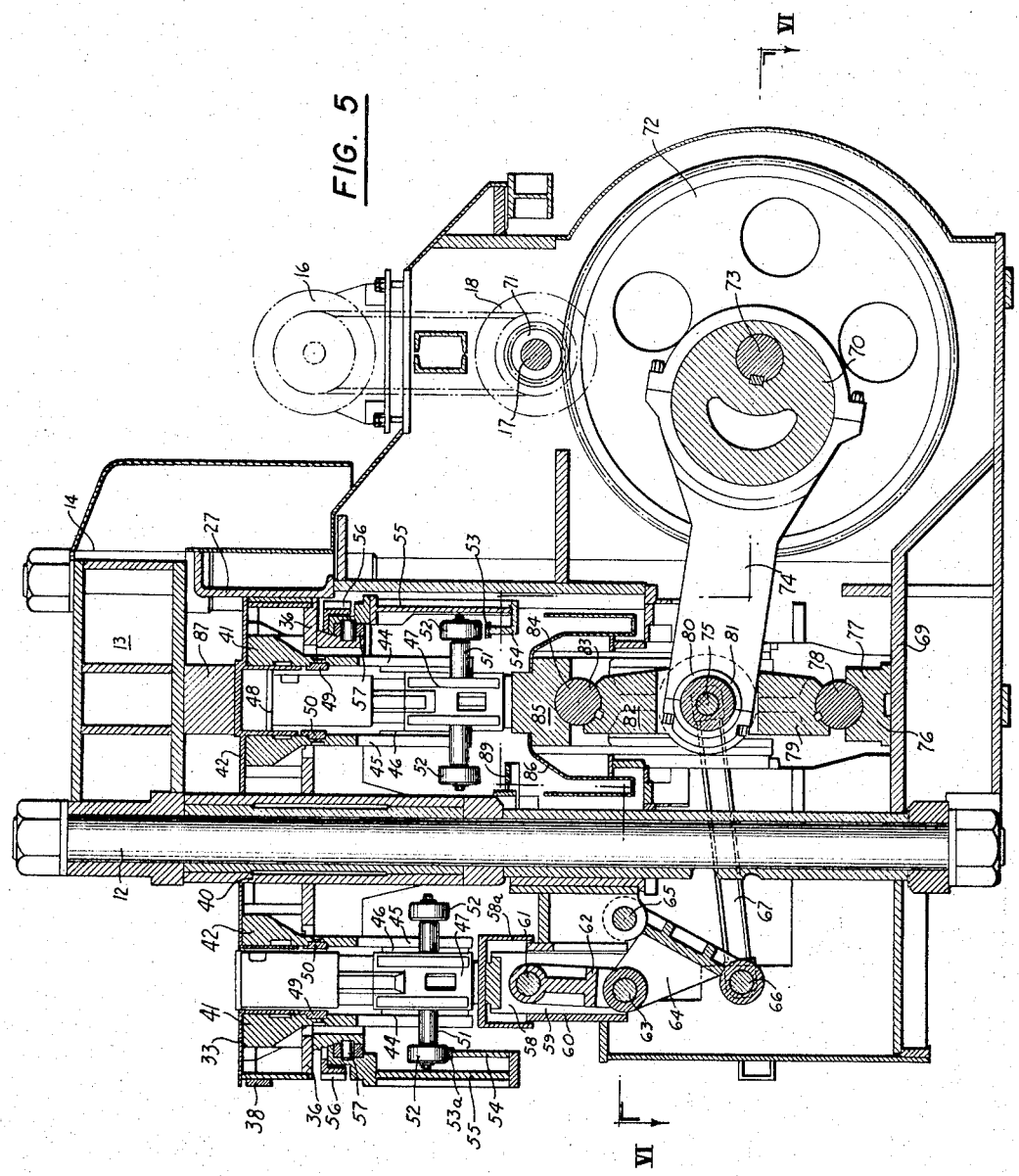
Figure 6:
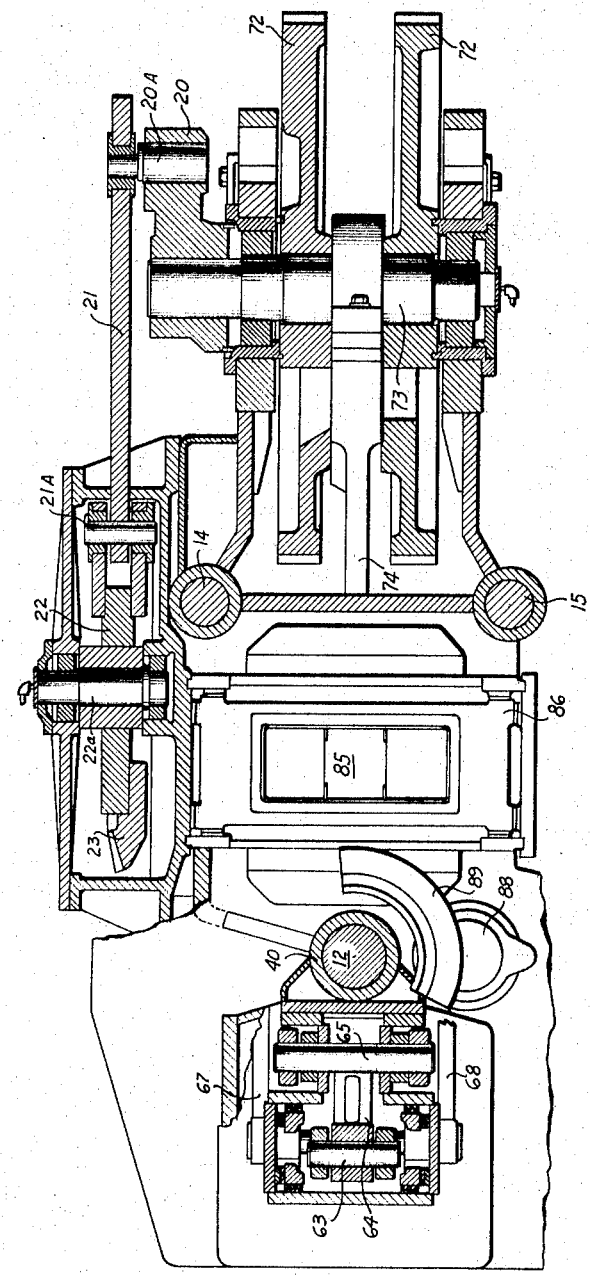
Figure 7:
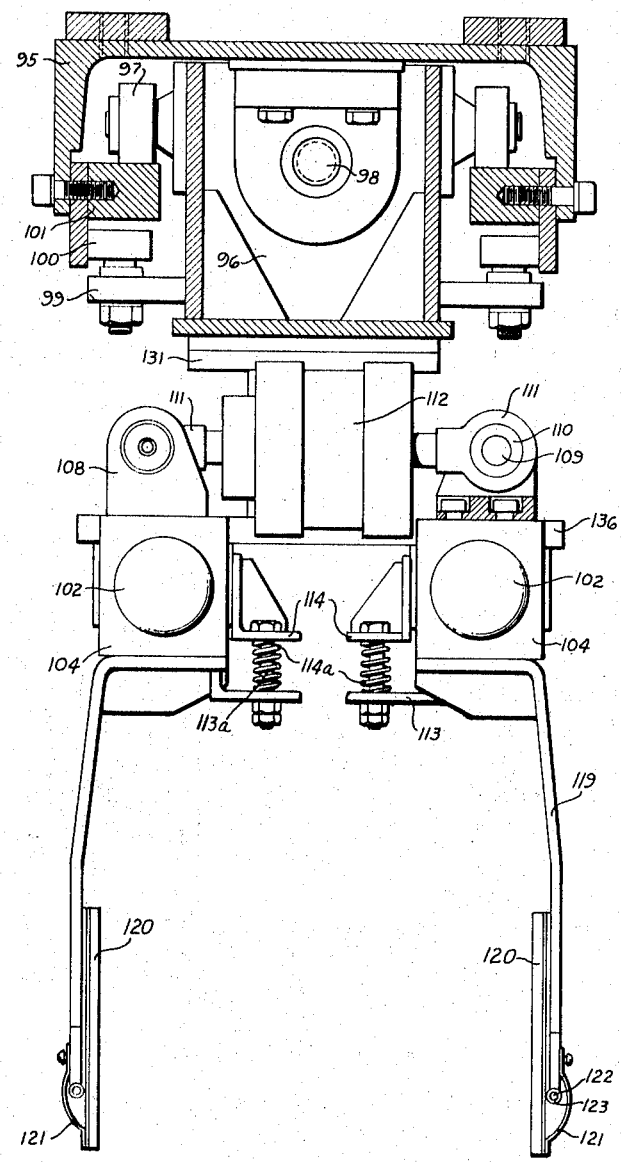
Figure 8:
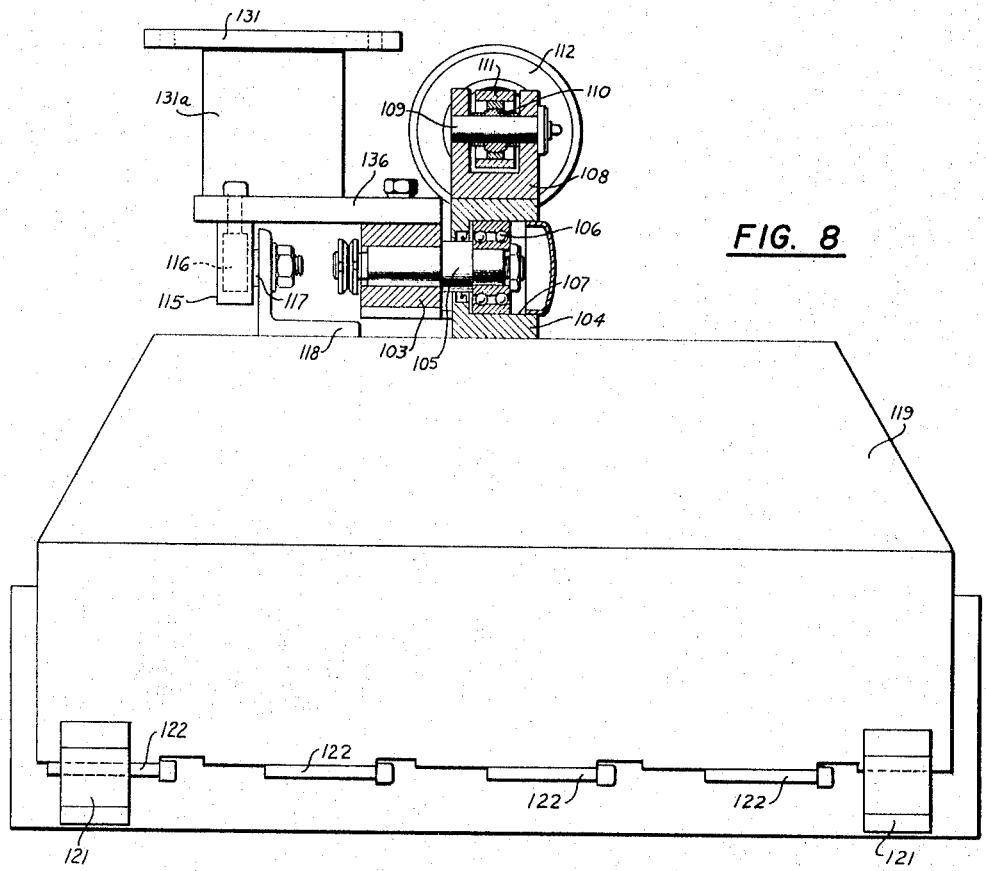
Figure 10:
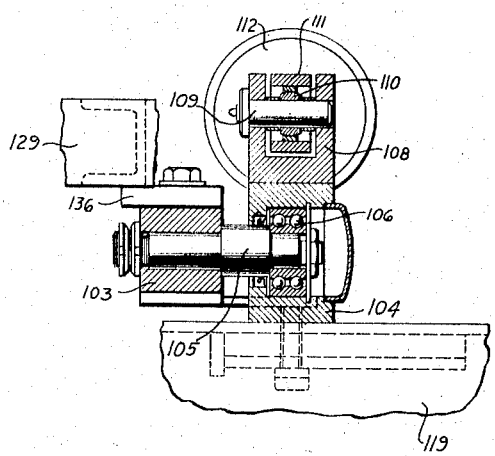

The character of the invention, however, may be best understood by reference to one of its structural forms as illustrated by the accompanying drawings in which:

FIG. 1 is a front elevational view of apparatus embodying the principles of the present invention, FIG. 2 is a side view of the apparatus, FIG. 3 is a plan view of a portion of the apparatus, FIG. 4 is a plan view of a press forming part of the invention, FIG. 5 is a sectional view of the press taken on the line V—V of FIG. 4, FIG. 6 is a horizontal sectional view of the press taken on the line VI—VI of FIG. 5, FIG. 7 is a side view of a transport portion of the apparatus, FIG. 8 is a side view of the transport portion, FIG. 9 is an elevational view of a portion of the transport apparatus, and FIG. 10 is a vertical sectional view taken on the line X—X of FIG. 9.

Generally speaking, the difficulties experienced with the prior art devices have been eliminated in the present invention by providing a brick manufacturing apparatus having a press with at least two transporting devices including a gripper carrier consisting of a sliding carrier on which two independent gripper devices are arranged at a fixed distance to each other. They can be moved interchangeably forwardly and backwardly from a lifting position over the press table to a loading position over an assigned transport mechanism. By this arrangement, it is possible to have one gripper device all ready to grip the next brick to be formed, while the other gripper can be setting down the previously-formed brick on the transport car. The working speed of the gripper devices can be maintained within selected limits and the output of the press itself can reach double the amount of previously-known transport devices of the well-known type.

The press has molds such as would be used in the fabrication of especially large bricks or of a number of smaller bricks in one working operation; the transport tracks of the sliding carrier can be arranged in a straight line and parallel to the sides of the brick which has been formed and which is to be lifted. In the present case, the set-down areas of the transport cars are arranged at the sides of the press table so that the direction of movement of the two transport elements run perpendicular to the tracks of the sliding carrier.

With presses of this kind, where the forming tools are so designed that with one working operation a large number of brick can be formed, the sliding carrier can be equipped with a movable clamp on the side pointing in the direction of movement of the transport car. On the secondary frame of the transport device is arranged a second clamp member. The last-mentioned clamp is shifted on rods, this movement being against the pressure of a spring in such a manner that it moves in a direction opposite the movements of the other clamp. The individual bricks lie in the press a certain distance apart because of grippers and intermediate plates and so on and those bricks already placed on the transport car from previous operations of the press can be pushed together with the clamps whereby the spaces between the bricks are eliminated.

The apparatus, according to the present invention, also permits equipping a press, especially a turn-table press, with different forming tools so that on the discharge station on the press table, for example, it is possible to lift either a single, large brick or a number of smaller bricks. In other words, one transport device moves only large bricks and the other only small bricks to the mechanisms arranged thereafter as, for instance, a stacking device.

Referring first to FIGS. 1 and 2, which show the general features of the invention, it can be seen that the brick manufacturing apparatus, indicated generally by the reference numeral 10, consists of a press apparatus 10a and a transport apparatus 10b. The transport apparatus is arranged to carry bricks 19 to heat treatment cars 158.

FIGS. 3, 4, 5, and 6 show the details of the press apparatus 10a, the inter-relationship of the press apparatus 10a and the transport apparatus 10b being particularly well shown in FIG. 3. The press is provided with a turn-table 11 which revolves around a turn-table shaft 12 in the center. Between the shaft 12 and two arms 14 and 15 is arranged a strut 13. The turn-table is provided with four mold openings 34 arranged in opposite pairs. A hopper (forming part of a filling device 31) has underneath it two driven-shafts each equipped with two stirring vanes (not shown) and serves to feed the raw mixture into the molds through the mold openings 34. These molds are always underneath the fill device. Adjustments and corrections for fill height in the molds lying in the openings 34 can be made by using a hand wheel 32 connected with a corresponding indicator. A wiper arm 35 operates for continuous cleaning of the table during rotation around the turn-table shaft 12.

The turn-table 11 is rotated in steps of 90° each; it is, therefore, necessary to stop the table after each quarter of a revolution, this being done by means of a brake band 26. The two ends of the brake band 26 are connected by an intermediate spacer 27 wherein a tension screw 28 is placed between each end and the said spacer. The brake band 26 is tightened by a cylinder 29 connected to a pressure line 30 so that the turn-table 11 is locked securely.

The drive for the turn-table 11 consists of a motor 16 operating through a spur gear 18 and a drive shaft 17. On the drive shaft 17 are wedged two drive pinions 71 which engage two cam gears 72 mounted on two shafts 73. Mounted on the end of the shafts 73, which extends through the housing, is an eccentric lever 20 which has mounted in its bore a pin 20a, the free end of this pin extending into the bearing of a driving rod 21 (see FIG. 6). The other end of the driving rod 21 also is provided with a bore in which slides a hub 21a which extends through two legs of a bifurcated drive lever 22. The drive lever 22 is mounted on shafts 22a which are embedded in the housing and are freely rotating. This drive lever carries on its free end a bevel gear 23 which, during its pendulum movements, engages a bevel gear (not shown) which is mounted on the lower end of an intermediate shaft 24 (see FIG. 4). This vertical shaft 24 carries on its upper end a gear wheel 25 which engages a switch ring 56 (FIG. 5) having the form of a gear rim.

The turn-table 11 consists of an upper turn-table plate 33 and a lower turn-table plate 36 which are connected by a number of bars to each other. On the circumference of the turn-table is mounted a brake band 38 which operates in conjunction with the brake band 26 described above. The table with its lower plate 36 is connected with a tube shaft 40 by a number of bars and through this tube shaft extends the turn-table shaft 12. Two mold carriers 41 and 42 of opposite hand are connected with the turn-table 11 by screws and serve to receive molds 43. By loosening the screws, the carriers can be removed and exchanged easily with a hoist.

The mold carriers 41 and 42 are reduced at the lower end and extend into the cylinders 44 and 45 through which a press stamp 47 is guided by bars. Because the two mold carriers and the press stamp form a unitary group, they can all be removed from the turn-table rapidly and without difficulty. The two-part design of the molding carriers 41 and 42 permits the mold plates and the press stamp to be exchanged easily. The press stamp 47 carries on its upper end a press stamp plate 48 which can be lowered within the mold as far as two stop bars 49 and 50; therefore, the stroke of the press stamp is limited in the downward direction.

A shaft 51 extends radially relative to the turn-table 11 through the press stamp 47 and is provided at each of its two ends with a roll 52. The outside roll slides on a guide rail 53 and 53a and is supported by a track 54 which extends around the table for 270°. The track 54 is tied to a track stand 55 which is fixedly connected to a switch ring 56. The switch ring 56 revolves concentrically over a roller bearing 57 in a manner independent of the movements of the turn-table 11. Four grippers (not shown on the drawing) are radially movable and distributed over the circumference of the turn-table; these serve as connecting elements between the switch ring 56 and the turn-table 11. In accordance with this arrangement, the movement of the driven switch ring 56 (brought about by the intermediate shaft 24 and the gear wheel 25) can be transferred to the turn-table 11 so that it is pulled along by the switch ring 56 as long as engagement exists.

A push-out piston 58, which is protected from dirt by a cover 58a, is provided with bars 59 which are guided in a push-out cylinder 60. Around a push-out shaft 61 and located externally of the piston 58 is positioned a swingable push-out fork 62. Between the two fork arms extends a fork shaft 63 (which is shown both in FIGS. 5 and 6). On this fork shaft 63 between the two fork arms is mounted a rotatable swing 64 which is capable of swinging freely around a shaft 65. The swing 64 is, at the same time, connected by a shaft 66 to a pair of piston rods 67 and 68. As has already been mentioned, the two cam gears 72 are driven by two engaging pinions 71 on a drive shaft 17. On the shaft 73 is keyed an eccentric cam 70 located centrally of the connecting rods 74.

Mounted in the bore at the other end of the connecting rods 74 is a shaft 75 driven by the crank and forming part of a crank lever joint. A lower crank lever 79 is supported on a lower compression roll 78 which, in turn, is supported in a bearing block 77 serving as part of a support 76. The support 76, in turn, is mounted on a traverse 69 which, in turn, is carried by the shaft 12 and the arms 14 and 15. To the shaft 75 is linked the push rod 67 which operates the push-out piston 58 by means of the swing 64. The shaft 75 rests in two bearing blocks 80 and 81 and the bearing block 80 is part of an upper crank lever 82 provided with a compression roll 83 which, in turn, is supported in a bearing 84. This bearing transfers the movements of the upper crank lever 82 through the bearing to press a piston 85. The press piston 85 is protected by a hood 86 from dirt. Above the press piston 85 is arranged a press stamp 47 which has a shaft 51 equipped with two rolls which extend in a direction radial of the turn-table. Otherwise, this press stamp is designed and guided in the same way as the one which has been described above. Also, the turn-table in the area of the strut 13 and the press piston 85 is designed in the same way as already described. The support 87 serves as a support for the press piston 85 during the press operation and this is arranged exactly above the mold opening on the lower surface of the strut 13.

The height to which the mold can be filled is adjusted by means of a fill piston 88 (see FIG. 6) in such a way that a guide track 89 associated with the fill piston is adjustable in the vertical direction. On the guide track 89 rests a roll 52 beside the turn-table shaft 12 so that, for example, by an adjustment of the height of the guide track 89 over the roll 52 which is resting on the guide track 89, the shaft 51 of the corresponding press stamp 47 can be raised. By this means the fill height in the mold is correspondingly lower because the press stamp plate 48 serves as the mold bottom.

Referring again to FIGS. 1 and 2, it can be seen that the transfer apparatus 10b consists mainly of a frame 90 on which is mounted a guide rail 91 having tracks. Furthermore, a guide chain 92 for the pressure hoses of a stacking car is arranged on each guide rail which extends on both sides over the frame. In FIG. 1, however, only one chain guide is shown. Each of two stands 93 serves as a fixed stop for a stacking car and limits its movements. As is evident in FIG. 2, a platform 94 extends from the frame 90 parallel to the guide rail 91 and serves as a guide track for a hoisting device.

The hoisting device consists mainly of two sliding grippers 96 arranged at a fixed distance from each other. This distance corresponds exactly with the track movement, and movement is brought about by a cylinder. The sliding grippers and the grippers attached to them are designed in exactly the same manner, as will be explained more fully hereinafter.

Referring to FIG. 7, each sliding gripper 96 is provided with four rollers 97 which are mounted on bolts and is also provided with a hydraulic cylinder 98. Furthermore, supported on outwardly-extending arms 99 are four rollers 100 each supported on a pin. These rollers guide the sliding gripper between two vertical tracks 101. The four rolls 97 run along a horizontal upwardly-directed surface of the guide track 101, while the rollers 100 engage inwardly-directed vertical surfaces. The sliding gripper has provided under the arms 99 a flange plate 131 on which are mounted (with the assistance of a spacer 131a (see FIG. 8) and a plate 136) two joints 102 with a pneumatic cylinder 112 and gripper bars 119 having pads 120.

To the support plate 136 is bolted a bearing pedestal 103 in which is carried a hinge pin 105. This pin carries on its free end a ball bearing 106 which is mounted inside a counterbore 107 in a support 104. On the support 104 is mounted a stand 108 through which extends a hinge pin 109. A swing part 111 (with the assistance of a ball joint 110) is attached to the outboard end of the pressure cylinder 112. On the side of the bearing pedestal 103 is attached an angle 113 to which is connected a bolt 113a which is connected to a second angle 114 mounted on the support 104. Between the two angles 113 and 114 extends a pressure spring 114a extending around the bolt 113a.

A roll 116 rotatable on a pin 117 is located in a support 115 which is attached to the flange plate 136. The hinge pin 117 is bolted to a support angle 118 which is attached to the tension bar 119 with a bolt 122 penetrating through the hinge 123 and kept in the vertical position by a leaf spring 121 connected to the tension bar 119.

Referring to FIGS. 3, 9, and 10, it can be seen that each stacking car consists of a frame 124 mounted on a shaft with a ball bearing. On the frame 124 is mounted an attachment 124a which engages the rod of the driving piston (not shown in the drawing) which moves the stacking car over the rail 91. Extending transversely to the surface of the frame 124 are two guide tubes 126 which lie in a vertical direction (only one being evident in FIG. 9) and in these tubes are guided hoist cylinders 127. A third guide tube 128 (see FIG. 1) serves as a guide for pressure hoses to the hoist cylinders 127.

The free ends of the hoist cylinders 127 carry a gripper plate 129 on which is attached a support plate 136 (see FIG. 10) for a joint support 102. Furthermore, a bracing 130 for a gripper bar 120 is attached to the gripper support. Otherwise, the four gripper devices of the two stacking bars are designed in the same way as the gripper devices of the hoisting device and one should refer to description of FIGS. 7 and 8 for the details. In addition, each stacking car is equipped with two switch-off devices 132 and 133 (see FIG. 1) which are designed as feelers. These switch-off devices consist mainly of a plate 135 connected to a bar and bar guide 134. When the plate touches a solid base, the bar is pushed in its guide tube 134 and operates a magnetic switch (not shown).

For control of the movements of the stacking car 124 and the hoist cylinder 127, there are provided switch cylinders 137 which are rotated by a ratchet and pawl mechanism in the same cycle as the press apparatus 10a. On the switch cylinder are arranged switch bars 137a which work together with a feeler 138 (see FIG. 2).

Transversely of the tracks of the two stacking cars corresponding to the two hoisting devices is arranged a transport belt 139, one on each side of the frame 90. Each belt runs over an idler roll 140 and a driven roll 141. A brake band 142 serves to stop the belt movement in rhythm with the rotation of the press. The driven roll 141 is mounted on a drive shaft 143 having a crank arm 144 connected to a push rod 145. This, in turn, is connected to a motor shaft 146. A transport belt 139 is driven by a motor 148 through the motor shaft 146 and the motor shaft lever 147, respectively. On the motor shaft 146 is arranged a known device which engages when the motor shaft turns the arm of a magnetic switch and actuates the same.

A hydraulic cylinder 151 is mounted on a platform 150 to extend transversely of the direction of movement of the transport belt 139. This cylinder with the help of a push plate 152 and a counter plate 153 pushes the bricks together transversely of the direction of movement of the transport belt into a compact package. Brushes 156 (see FIG. 2) are attached to two cover plates 155 on the side of the transport belts 139 and these serve to brush off the raw material dust which is still on the bricks after they were deposited on the transport belts. A band brush 157 which is mounted on a shaft and driven from the driving shaft 143 serves to clean the transport belt after this has passed over the drive roll 141.

The single packages, each containing four bricks, will be placed by the grippers of the stacking cars 124 after regulation by the control cylinder 137 in several layers on the heat treatment cars 158 located underneath the track 91 when the stacking car is still above the transport belt 139. As soon as this car 158 is filled, a new car will be passed underneath the track 91 while the stacking car is still above the transport belt 139.

The operation of the brick manufacturing apparatus including the press apparatus 10a and the transport apparatus 10b will be readily understood, in view of the above description. The mixed raw material passes by the operation of a slide from the fill-hopper 31 into the four molds located under the fill-hopper. The press stamp plate 48 serves as a bottom for the mold and the press stamp lowers slowly during the fill operation until the inner roll 52 rests on the guide track 89 which is connected with the fill piston 88. The press piston reaches its lowest point during this operation. This point can be raised or lowered to the desired fill height by operating the fill piston 88 and by lifting the guide track 89. By an even lowering of the press stamps 47 one may guarantee even, air-free filling of the forms with the raw material.

At the end of the filling operation, the turn-table 11 and the switch ring 56 (which are then fixed relative to each other) turn 90° so that the filled mold can go from the fill station underneath the fill hopper into the press station beneath the strut 13, the table rotating counter-clockwise as it is observed in FIG. 3. During this turning movement of the turntable 11 and the switch ring 56, the inner roll 52 passes over the guide track 89 so that the fill stamp 47 maintains its full position during the entire 90° turn of the turn-table. Since the press stamp can keep its position over the entire quarter turn from the fill station to the press station (because of the guide track 89 pressing against the inner rolls 52) a lowering of the press stamp plate 48 down to the stops 49 and 50 is prevented, so that the material on the table cannot go into the molds and, therefore, a consistent quality of formed bricks is always guaranteed.

As soon as the filled mold with the corresponding press stamp has reached the press station (see FIG. 5, right-hand side), the press piston 85 will be operated by the piston rod 74 and the joint shaft 75. The two crank levers 79 and 82 assist, so that the press stamp 47 reaches its predetermined position corresponding to the dimension of the formed brick and the bricks are pressed from the raw material within the mold. This condition can be seen in FIG. 3 at the right-hand side.

The press stamp 47 located in the press station will be taken over by the guide track 53 and pulled by the switch ring 56 and the turn-table 11 (which are locked together) for another quarter turn into the station opposite the fill station. After the table and switch ring together have made the second quarter turn, the lock is loosened and the switch ring 56 makes a quarter turn in the opposite direction, while the turn-table is stationary, so that the guide track 53 is again in position in the area of the press station underneath the strut 13 and can take over the next press stamp 47. Since the table itself was stationary during the last switch step (that is, the back movement of the switch ring 56 to the press station), and since the guide track 53 remained always the same distance from the turn-table, no vertical movement of the press stamp was made within the intermediate station, that is to say, the station opposite the fill hopper 31.

During the return movement of the switch ring 56 with the guide track 53, the finished formed brick was pushed out by the push-out piston 58 in the discharge station (opposite the press station). As soon as the press stamp 47 within the mold (see FIG. 5, left side) has reached its highest vertical position, it will be kept there as the result of the return movement of the switch ring. At this point, the slightly lifted guide track 53a is in this position under the outer roll 52 so that the press stamp plate 48 is level with the surface of the table plate 33. The lifting of the finished bricks takes place at the same time as the pressing of a new brick in the oppositely-arranged press station, because the rod 67 which moves the push-out piston 58 (through the swing 64 in its upper position over the joint shaft 75 of the crank lever joint) is operated from the connecting rod 74 at the same time as the crank lever joint and the press piston 85.

Now, the turn-table 11 and the switch ring 56 will be locked together again so that they can make another quarter turn and the finished brick can be brought from the intermediate station to the discharge station. During this operation, the press stamp carrying the formed brick into the intermediate station will be kept in its position by the guide track 53 and pulled into the delivery station. As soon as the finished bricks arrive in the delivery station and the press stamp has pushed them out, the switch ring 56 moves back a quarter turn and the turn-table remains, so that one end of the switch ring (which extends around 270°) can return to the press station to pick up a press stamp and, at the same time, support the elevated guide track 53a underneath the outer roll 52 of the press stamp 47. As shown in FIG. 3, this keeps the press stamp plate 48 level with the upper turn-table plate 33. After another inter-locking action of the switch table and the turn-table, both of them execute the fourth quarter turn so that the press stamp is back in the filling station. As soon as the press stamp is back in the filling station the connection between the turn-table 11 and the switch ring 56 is again broken and the switch ring returns a quarter turn. Because the guide track of the switch ring in rest position between the delivery and filling station in the last quarter has the shape of a slope running downwards and this sloped guide track lies between the filling station and the press station, when the press stamp comes back into the filling station, the press stamp lowers in the filling station during back movements of the switch ring. These back movements are opposite to the turning direction of the turn-table and are in a manner slowly corresponding to the slope of the guide track. At the same time, the raw material will be inserted from the filling hopper 31 to the mold.

The turning of the turn-table and of the switch ring is accomplished in such a way that, after each quarter turn of the table and switch ring together, the switch ring alone returns a quarter turn, while the table remains stationary. Thereafter, the turn-table and the switch ring will again be connected and together they will make another quarter turn. The table, therefore, turns together with the switch ring only in one direction. The switch ring, however, completes alternately a forward and backward movement for a quarter turn, this being caused by the pendular movement of the drive lever 22 and its bevel gear segment 23 on the intermediate shaft 24 operating through the gear wheel 25 which is engaged by the switch ring 56, as shown in FIGS. 4 and 6.

Because of the movement of the turn-table 11 and because of the operation of the push-out piston 58 and the press piston 85 (brought about by a common motor 16 through the spur wheel gear 18, the drive shaft 17, the two drive pivots 71, the cam gear 72, and its shaft 73), the common movement of the switch ring 56 and the turn-table 11, along with the back movement of the switch ring relative to the fixed table and also the vertical movements of the two pistons 58 and 85, can be adjusted and exactly synchronized. The brake band 26 stops the table promptly after each quarter turn and it is also connected so that it operates when the drive falls off or is switched off under any circumstances. This arrangement eliminates the possibility of any damage to the various control and drive elements by a sudden turning off of the press in any phase of operation.

The turn-table 11, as can be best seen in FIG. 3, is arranged relative to the transfer apparatus 10b in such a way that the tracks 94 lie exactly above the delivery station and above the push-out pistons 58. The height of the track 94 is selected in such a way that the lower edges of the gripper bars 120 of the gripper device lie close to the upper surface of the turn-table plate 33. Therefore, any up and down movement of the gripper device will be eliminated and the finished bricks pushed out by the push-out piston can be lifted and carried from the press stamp plate 48 by operation of the two gripper bars.

As soon as one sliding gripper 96 is positioned above the push-out station, the gripper bars 128 are, at the same time, positioned parallel to the short sides of the four finished bricks, so that these bricks are gripped by the operation of the pneumatic cylinder 112 and by the swinging of the gripper bars 119 and 120 around the two bolts 105. As soon as the two gripper bars 126 are lying tightly on the four finished bricks, the sliding gripper 96 will be carried with the help of the hydraulic cylinder. In the example of FIG. 1, these bricks are transported to the left so that they are positioned above the left transport band 139. Since the pneumatic cylinder 112 at this moment is not under pressure any more, the two pressure strings 114a swing back into the rest position over the two angles 113 and 114 and the two press and gripper bars 119 and 120, so that the finished bricks are free and left on the transport belt 139.

Since the two sliding grippers 96 are connected rigidly with one another and their distance corresponds exactly to the distance between the push-out station of the press and the transport belt 139, one sliding gripper is always located above the delivery station of the press and the other sliding gripper, at the same time, is located above a transport belt 139. This means that, when one gripper takes a package of finished bricks from the press stamp plate at the delivery station, the other gripper, at the same time, puts down a package of finished bricks on a transport belt 139. The turn-table 11 makes a quarter turn during the movement of one gripper from the delivery station to the transport band and during the opposite movement of the other gripper.

Each transport belt 139 extends perpendicularly to the tracks 91 and 94a and carries the finished bricks placed on it by the gripper in the direction of the arrow (in FIG. 3) underneath the track 91 for transport by the stacking car 124. However, the transport belt 139 does not run continuously, but operates discontinuously, the movement taking place after the working cycle of the turn-table. In the case in which the bricks are pressed in one mold, i.e., several bricks in one press stroke, as shown in the example, these four bricks lie on the transport belt 139 at a distance from each other which corresponds to the thickness of the dividing walls of the press mold. The package of bricks arrives after being placed on the transport belt 139 between the push plate 152 and the counter plate 153 during the next working operation. By the operation of the hydraulic cylinders 151, the four bricks will be shifted transversely of the direction of movement of the belt in such a way that they lie close to each other and form a complete package. During further movement of the transport belt, the package of bricks moves underneath the brushes 156 and the loose material is brushed off.

As soon as the four bricks arrive beneath the track 91 and also underneath the stacking car 124 (usually after eight working operations of the turntable), the hydraulic cylinders 127 of the stacking car 124 will be operated and the gripper plate 129 with its gripping parts will be lowered. This downward movement of the gripper plate terminates when the stop plate of the switch-off device 133 meets the transport belt and the magnetic switch of the switch-off device is operated. Thereafter, the pneumatic cylinders 112 on the gripper plate 129 are operated so that the gripper bars 120 touch and grip the bricks. By means of a transport piston, the stacking car on the track 91 will be transported transversely of the transport belt 139 until the feeler 138 on a switch bar 137 of the switch cylinder 137 touches and switches off the transport piston. The stacking car then has the proper position corresponding to the location of the heat treatment car 158 which is positioned underneath the track 91. Then, the hoist cylinder 129 can be operated and it lowers the gripper plate 129 with its four grippers. This downward movement is also limited by a switch-off device 132 or 133, as has been described already before. At the end of the downward movement of the gripper devices, the grippers 119 and 120 are unclamped from the finished bricks so that they can be placed on the car 158 for removal to a furnace for heat treatment. Thereafter, the gripper plate will be lifted by operating the hoist cylinder 127 again and the stacking car 124 is carried into position above the transport belt 139, as shown at the right side of FIG. 1.

The two heat treatment cars 158 are always being loaded. However, the two stacking cars extending from left and right from the frame 90 are in action only when there are four packages of formed bricks underneath them. The horizontal movement of the stacking cars 124 will be controlled by the combination of switch bars 137a and feelers 138. The switch cylinder 137 turns in a cycle corresponding to the working cycle of the press apparatus 10a.

As soon as the heat treatment car 158 is loaded, it will be moved out of the stacking area by well-known transport devices and a new car will be put in its place. It can be seen that the interchange of the car 158 and the means by which it is transported can be controlled from the working cycle of the press apparatus, so that the filling of raw material, pressing of the formed bricks, the discharge and transport of the bricks from the turn-table, and the stacking on the car for heat treatment, as well as the transportation of these heat treatment cars, can be made automatic.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A brick manufacturing apparatus, comprising:
    (a) a turn-table arranged for successive 90° rotations about a vertical pivot and having mold openings 90° apart,
    (b) filling, pressing, intermediate, and unloading stations arranged 90° apart around the pivot,
    (c) a strut extending over the mold opening of the turn-table at the pressing station, and
    (d) a drive means operating a press piston at the pressing station and a push-out piston at the unloading station,
    (e) each mold opening of the turn-table having a press stamp for supporting a mold in the opening associated with it, a roller associated with each press stamp, and an annular ring underlying the turn-table and having a formed cam contacting the roller of each press stamp to regulate its height relative to the mold opening,
    (f) and means for connecting and disconnecting the turn-table with the said track whereby the track rotates alternately forwardly in one direction and in the other direction for 90° rotating with the 90° turn-table motion and then returning 90° without the turn-table.

2. A brick manufacturing apparatus for use with a press having an unloading station, comprising:
    (a) a first horizontal track passing over the unloading station and extending substantial distances in both directions away from the station,
    (b) two transport belts one lying under each end of the track and extending at a right angle to the track,
    (c) two gripper carriers each movable along the track alternately from a position over the station for grasping finished brick to a position over a transport belt for the deposit thereon of the brick,
    (d) two second horizontal tracks each lying at a right angle to a transport belt and extending a substantial distance away from the press, and
    (e) two stacking carriers each movable along one of the second horizontal tracks from a position over the transport belt for grasping finished brick to a position substantially removed for stacking of the brick.

3. A brick manufacturing apparatus as recited in claim 2, wherein each stacking carrier is provided with a vertical movement and with feelers which contact the transport belt and stop vertical downward movement of the stacking carrier adjacent the surface of the transport belt and which may contact a car on which brick is to be stacked to stop the gripping carrier in its downward movement adjacent the layer on which the bricks are to be laid.

4. A brick manufacturing apparatus as recited in claim 2, wherein the two gripper carriers are held in fixed spaced relationship so that, while one is over the unloading station the other is over its respective transport belt.

5. A brick manufacturing apparatus as recited in claim 2, wherein each transport belt is provided for means for moving successive sets of bricks into close contact with one another and for cleaning the bricks as they move along the belt.

6. A brick manufacturing apparatus as recited in claim 2, wherein each of the gripper carriers and each of the stacking carriers is provided with a pair of clamping arms and pads for grasping opposite sides of a set of finished bricks, the arms being hinged at their upper ends and being actuated by a pneumatic piston cylinder.

7. A brick manufacturing apparatus as recited in claim 2, wherein the transport belts are moved incrementally in step with the cycles of rotation of the turn-table so that successive sets of bricks are moved from the unloading station of the turn-table to a position on the transport belt immediately following the last set of bricks.

8. A brick manufacturing apparatus, comprising:
    (a) a turn-table arranged for successive 90° rotations about a vertical pivot and having mold openings 90° apart,
    (b) filling, pressing, intermediate, and unloading stations arranged 90° apart around the pivot,
    (c) a drive means operating a press piston at the pressing station and push-out piston at the unloading station,
    (d) a first horizontal track passing over the unloading station and extending substantial distances in both directions away from the station,
    (e) two gripper carriers each movable along the track alternately from a position over the unloading station for grasping finished brick to a position substantially removed therefrom for the deposit of the brick,
    (f) two transport belts one lying under each end of the track and extending at a right angle to the track, and
    (g) two second horizontal tracks each lying at a right angle to a transport belt and extending a substantial distance away from the press and two stacking carriers each movable along one of the second horizontal tracks from a position over the transport belt for grasping finished brick to a position substantially removed for stacking of the brick.

(References on following page)

References Cited

UNITED STATES PATENTS

| | | | |
|---|---|---|---|
| 1,599,151 | 9/1926 | Vought | 25—66 X |
| 2,494,212 | 1/1950 | Spriggs et al. | 25—65 |
| 2,560,208 | 7/1951 | Benischek | 25—41.5 |
| 2,985,926 | 5/1961 | Fellows | 22—31 X |

FOREIGN PATENTS 830,552   3/1960   Great Britain.

J. SPENCER OVERHOLSER, *Primary Examiner.*

E. MAR, *Assistant Examiner.*